Figure 6:
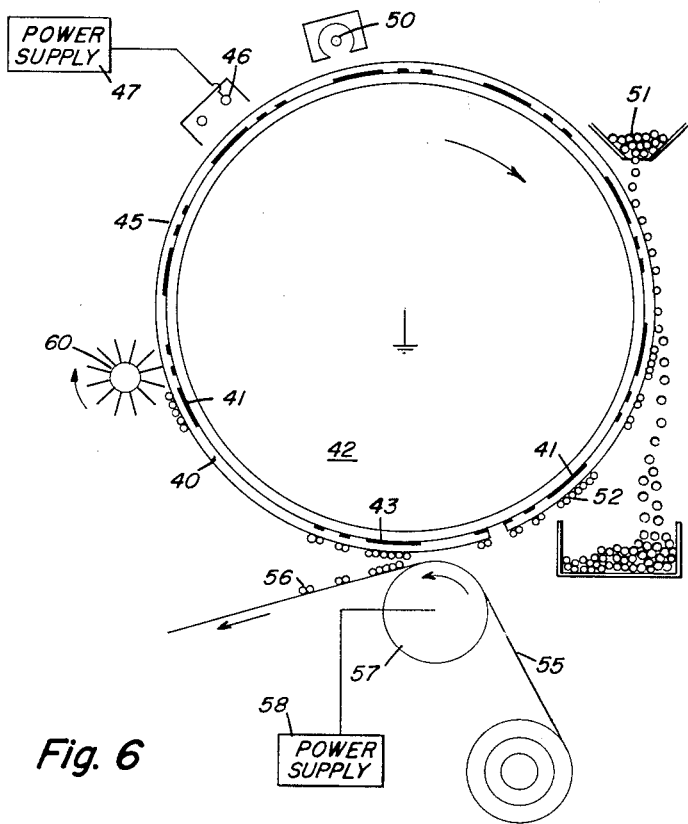

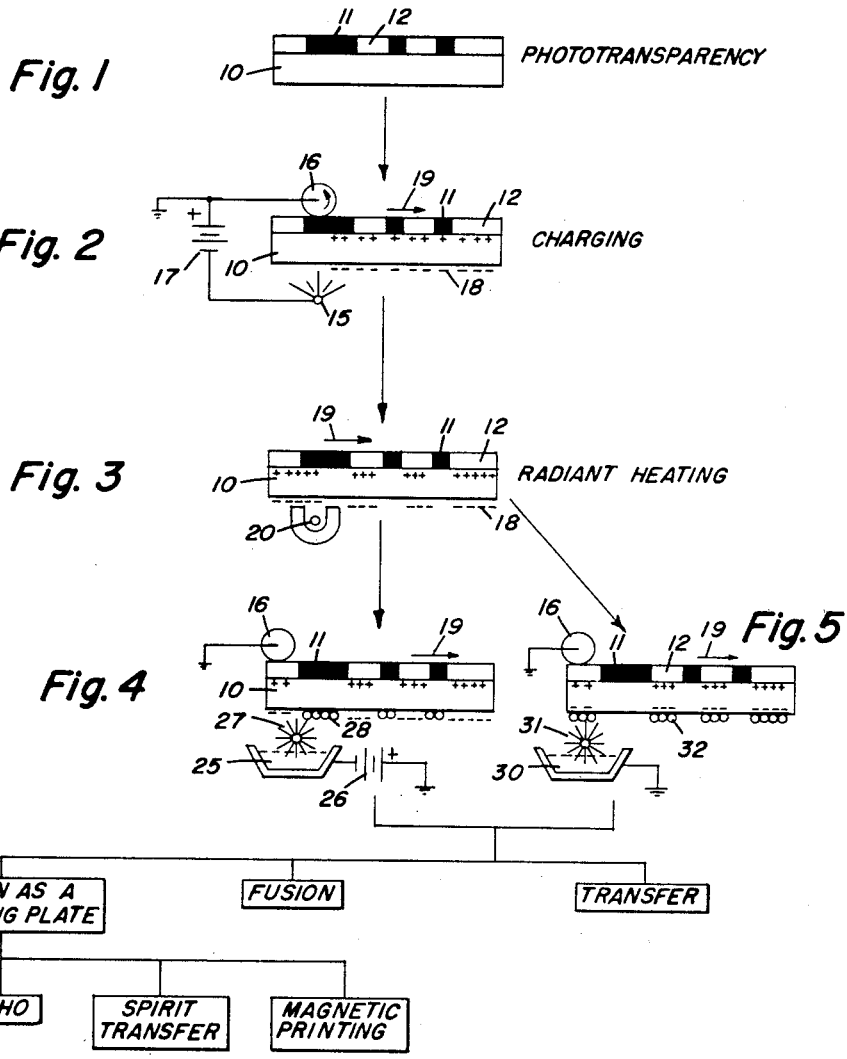

May 12, 1964   J. G. JARVIS   3,132,963
XEROTHERMOGRAPHY

Filed March 23, 1962   2 Sheets-Sheet 2

JAMES G. JARVIS
INVENTOR.

BY R. Frank Smith
F. W. Emerson Holmes

ATTORNEYS

3,132,963
XEROTHERMOGRAPHY
James G. Jarvis, Rochester, N.Y., assignor to Eastman Kodak Company, Rochester, N.Y., a corporation of New Jersey
Filed Mar. 23, 1962, Ser. No. 181,878
5 Claims. (Cl. 117—17.5)

The present invention relates to xerothermography, a process first described in applications Serial Nos. 25,108, Jarvis, and 25,109, Dumlage and Jarvis, both filed April 27, 1960.

The present invention is a much simpler system and has many advantages over prior forms of thermography, xerography, xerothermography and thermoxerography. It also has some limitations which will be mentioned below, but the advantages far out-weigh the limitations, thus providing a very practical and useful process.

The object of the invention is to provide a simple method of intensifying, reversing or masking a transparency such as a photographic negative or positive transparency or for converting the transparency itself to a printing plate for use in lithoprinting, spirit transfer printing or magnetic printing; thus the present invention has great versatility. The end product is useful in the various ways in which xerographic images are used including use as printing plates as just mentioned.

One of the complications of prior xerothermography is occasioned by the need for firm contact between the image being printed and the xerothermographic sheet. Such difficulties are similar to those encountered in thermography. In the present invention these difficulties are eliminated by having the image which is to be reproduced integral with the xerothermographic layer. In one embodiment of the invention this is provided simply by drawing directly on the xerothermographic layer with a carbon containing (or other radiation absorbing) link. In another embodiment, which has many special advantages, one simply uses an ordinary photographic film with a silver image in gelatin on a plastic support which has no backing or from which the backing has been removed. The film support may be any of the supports now commonly used including cellulose acetate and polyester film. The latter is preferable because polyester films can be thinner than cellulose acetate supports. The image quality or definition obtained by the present invention, decreases as the thickness of the support increases. Accordingly one of the limitations of the present process is the fact that the support must not exceed .005 inch and preferably should not exceed .003 inch.

If the photographic transparency is on an ordinary film having an electrically conducting backing such as a gelatin layer, this must be removed for example by an enzyme solution and/or abrasion with a very fine abrasive paper.

Film supports such as cellulose acetate or polyester have sufficient electrical resistance to store electrostatic charges except when heated. Heat lowers the resistance and permits the charges to leak away. According to the invention, the rear surface of such a transparent film support is electrostatically charged while the front surface integrally carries the developed silver and gelatin photographic image (or, in the less preferred embodiment, a carbon ink image). The silver image (or carbon ink or other radiation absorbing image) is then exposed to radiation such as infrared which is highly absorbed for example by exposure in a standard thermographic printer, the exposure being sufficient to heat the image and the underlying areas of the film support to the degree necessary to allow the charges to leak away. Thus there remains on the rear surface of the film an electrostatic image, with the charge in the non-heated areas. Xerographic toner is then applied to the rear surface carrying this electrostatic image, which toner may have a composition depending on the purpose to which it is to be put, all as discussed below and which toner may either adhere to the non-charged areas or to the charged areas as is common in the various forms of xerography.

After the toner image has thus been formed on the rear surface of the transparent film support, it may be used in any of the many ways in which xerographic images are used. For example it may be fuzed in place by heat or pressure and thus constitute an intensification of the silver image or, if deposited in the charged areas, a reversal of the silver image provided the toner has greater optical density than the silver image itself. The toner may be either a contrast increasing or a contrast decreasing mask for the original image. Such a mask is particularly useful when produced by so-called "fringe" development which emphasizes the edges of the image areas. The effect is improved detail similar to that obtained by unsharp masking in photographic printing. Alternatively the toner may be transferred to a receiving sheet such as paper and fuzed thereto. A succession of such transfers may be made with or without retoning or with or without recharging and retoning. When recharging is used, the image is also reheated since the increased conductivity of the support is lost when the support cools to room temperature. With the reheating, recharging, retoning and successive transfers, one has a zeroprinting plate and process, which differs from ordinary xeroprinting by the need for and use of the heating step.

Another embodiment fuzes the toner to the film support and the toner in this case is a hydrophilic one which permits the support (which is hydrophobic) to be used for lithoprinting. The toner image can similarly be made of a material suitable for spirit transfer or may be magnetic for the printing of magnetic inks.

The invention will be more fully understood from the following description when read in connection with the accompanying drawings and from the examples which follow such description. In the drawings:

FIGS. 1 to 4 constitute a flow chart schematically showing the essential steps of one embodiment of the invention.

FIG. 5 similarly shows an alternative for the step shown in FIG. 4. The various uses for the product of such steps is illustrated by legends below FIG. 4.

FIG. 6 schematically illustrates a xeroprinting process utilizing the invention.

In FIGS. 1 to 5 an ordinary photographic transparency (negative or positive) consists of a plastic support 10 carrying a silver image 11 in gelatin 12. The silver image may either be a fully exposed and developed one or a faint image requiring intensification. The support 10 may be cellulose acetate, polystyrene or polyester. These materials at room temperature have sufficient electrical resistance to store a surface charge. The rear surface of the support 10 is free of any conducting material. If the negative or positive transparency is made on ordinary film having a gelatin backing, such as is used for antistatic, anticurling and/or antihalation purposes, this backing is removed by suitable solutions such as an enzyme solution and/or by abrasion with a fine abrasive. The transparency may be either negative or positive and may, when viewed through the base, be either right-reading or laterally inverted.

In FIG. 2 the transparency is passed between a source of corona 15 and a backing roller 16. The corona source is held at a high negative potential by a source illustrated schematically at 17. This corona produces a uniform negative charge 18 on the rear surface of the support 10. Of course positive polarity may alternatively be used.

In FIG. 3 the charged transparency is passed in front of a source 20 of intense infrared radiation. Such exposing devices are commonly used in thermographic printing machines. The exposure may be from either side of the film. In the arrangement shown, the exposure is through the base 10 and the infrared radiation is absorbed by the silver image 11, heating the image 11 and the underlying areas of the support 10, i.e. those areas which are adjacent to the image. Radiation not striking the image 11 passes freely through the support 10 and the gelatin layer 12 without being appreciably absorbed. The charges 18 leak away through the heated areas of the support 10. This leaves an electrostatic image on the rear surface of the support 10, with charges only in the non-heated areas. The direction of movement of the transparency is indicated in each of FIGS. 2 to 5 by the arrow 19.

This electrostatic image may be toned by any of the methods common to xerography including cascade development, magnetic brush development, spray development and simple dusting. If the toner particles are uncharged particularly when the particles are electrically conducting, or (as is preferable) if they have a charge opposite to that of the electrostatic image, they tend to adhere to the charged areas. On the other hand if they are electrostatically charged with the same charges as the image, they tend to adhere to the discharged areas of the support 10. The latter arrangement is shown in FIG. 4 wherein the toner particles 25 carry a negative electric charge produced by tribo electricity. These charges are applied by a brush 27 biased by a potential source indicated schematically at 26 and adhere in areas 28 adjacent to the image areas 11.

In FIG. 5 on the other hand toner 30 (which is of positive polarity due to triboelectric effects) is applied by a brush 31 and adheres in areas 32 adjacent to the non-image areas of the gelatin 12, between the areas of the silver image 11. This toner image is positive if the silver image is negative. Such reversal is used with weak (low density) silver images or with transfer processes.

The resolution or sharpness of the image thus produced on the rear of the film support depends on the thickness of the support. Sharpest images are produced with the thinnest supports since the critical surface is then nearest to the silver image 11. However, satisfactory images for many purposes have been obtained with support thicknesses up to .005 inch and very satisfactory ones are obtained with polyester supports of .0025 inch or less. As is known in xerography, the toner particles may be selected because of color, chemical reactivity, luminescence, conductivity, solubility, dielectric constant, wettability, magnetizability etc. The selection is made depending on how the toner image is to be used. For example the image may be developed with a colored powder (e.g. black) and this powder transferred to paper, parchment or transparent film. The operation may be repeated any number of times. Recharging and reexposing may be used when necessary but in general this is not necessary for every cycle. As a second alternative the toner may be a soluble dye which is subsequently used in a spirit type duplicating operation. The film support itself may be used directly as the printing master or the dye may be first transferred to another master support. Thirdly the toner may be hydrophilic with high wettability in which case the film constitutes a lithographic printing plate. Fourthly the toner may be magnetized particles and the plate is then useful as a magnetic printing plate with magnetic inks. All such toners are known in xerography and their composition is not a feature of the present invention.

It should be noted that these particular processes have many of the advantages of xerographic printing, for example, dryness and at the same time many of the desirable features of silver halide photography, for example high speed and panchromatic, or other desired spectral, sensitivity. The present process is a direct dry one and is used for obtaining prints from or duplicates of more or less conventional films (except for the absence or removal of the backing).

Although the present invention employs xerothermographic principles, it has two important distinguishing features:

(1) There are no contact problems. No two-layer sandwich has to be assembled prior to exposure because the recording layer (the film support) and the heat-absorbing pattern (the developed silver) are integral with one another.

(2) A common deficiency of thermographic processes employing infrared-rich exposing sources, namely color-blindness, is nonexistent since the thermographic step is only with developed silver which absorbs strongly over a very broad spectrum, and the original photographic step can be with panchromatic materials. The xerographic steps (charging before exposure and toning afterwards) do not involve spectral sensitivity.

The process does have three limitations namely the fact that the rear surface of the support must be free of any gelatin coating, secondly the support cannot exceed .005 inch thickness if good definition is to be obtained and thirdly, the reproductions are always the same size as the silver image.

It is desirable (but as shown in the example below, not absolutely necessary) in the present process to avoid touching the charged surface of the film between the charging and developing step. FIG. 6 shows a continuous process having this feature and the advantages of transfer (repeat) printing by the equivalent of xeroprinting. There is one step not found in ordinary xeroprinting, namely the radiant heating step. A photographic film 40 having a developed silver image 41 is wrapped image side in on a grounded metal drum 42. A thermally insulating but electrically conducting spacer 43 is placed between the film 40 and the drum 42. Ordinary paper serves adequately as such a spacer. The rear surface 45 of the film 40 is electrostatically charged by corona from wires 46 held at high potential by a source of E.M.F. 47.

As the drum rotates, the charged surface passes under a heating lamp 50 of the type used in thermographic printers. The radiation from this lamp is absorbed by the surface image 41 as discussed above which heats the image and the adjacent areas of the support 40 and allows the charge in these areas to leak away through the film. The residual charges in the areas not adjacent to the silver constitute an electrostatic image. Simple cascade development from a bin of toner powder 51 causes toner to adhere either in the charged areas or to the non-charged areas as desired. In the arrangement shown, the toner adheres adjacent to the silver image 41 as indicated at 52. The film and image are carried by further rotation of the drum past a transfer point at which some of the toner transfers to a receiving sheet 55 forming an image 56 on the surface thereof. The receiving sheet passes over a drum 57 at the transfer station and this drum is held by a power source 58 at a high potential opposite to that of the toner particles in order to enhance and intensify the transfer of the particles 52 to the transfer sheet 55 to form the image 56 which may be then fuzed in place or further transferred as desired. It is interesting to note that the transferred image 56 may be on a transparent support similar to 40 and may be used just exactly as the original silver image 11 is used in a xerothermographic process for further printing.

Further rotation of the drum 42 carries the residual toner past a cleaning brush 60 which removes this toner before the recharging step as rotation of the drum carries the film once again past the charging station 46. It should be noted that the surface which is charged, exposed and toned does not touch any surface in the arrangement shown, except the toner particles 51 and the cleaning brush 60. The transfer sheet 55 is very close to the surface and may or may not touch the surface during the transfer step, but the important period between the charging at 46 and the toning has the surface free of contact with anything other than the atmosphere.

The following examples have given satisfactory results.

*Example 1*

The anticurl backing was removed from a sheet of processed Kodak Autopositive film (bearing a positive image) with an enzyme solution (5% Takamine) and a few passes (after drying) of a 400-grit aluminum oxide abrasive paper. The film was (1) placed, silver-side down, on an earthed aluminum plate and passed under a negative corona discharge; (2) stripped from the aluminum plate; (3) passed through a standard commercial (Secretary Thermo-Fax) copier at a setting of 6; and (4) developed by cascading an electroscopic material over the free surface of its support. The electroscopic material, Xerox Copyflo N-1, contained negative polarity toner particles which became attracted to areas corresponding to the silver image. The image was then electrostatically transferred to a sheet of bond paper to which it was fixed by heat. The operation was repeated several times to yield a plurality of copies. The cellulose acetate support of the Autopositive film was 0.005 inch thick which reduces definition somewhat but legible and quite useful copies were obtained.

*Example 2*

As in Example 1, except that the film was a Kodak type IV Kodalith film bearing a positive image and the thermograph copier setting was 5. The backing of the film support (0.002 inch Estar in this case) was removed by abrasion. The resulting copies were much sharper than the ones in Example 1, reproductions of 1/32 inch-high printed characters being quite legible and quite useful. Thus the process is excellent for so called "office copying" since such definition is more than adequate.

*Example 3*

As in Example 2, except that the film bore a negative image. The corona discharge was changed to a positive polarity so that the toner of the same Copyflo N-1 developer was attracted to the areas corresponding to nonsilver parts of the pattern. A positive reproduction resulted.

*Example 4*

As in Example 2, except that transfer was made to Map Overlay paper, a translucent material. The toner could be viewed through the paper in the event that an opposite-reading image was desired.

*Example 5*

As in Example 2, except that transfer was made to clear 0.001 inch polyester (Mylar) sheeting. The resulting image could be viewed from either side, could be viewed by projection, could be used in projection or contact printing, or could be used in another xerothermographic process (i.e. repeating the present invention). It is noted that microfilms on sufficiently thin supports, could be duplicated in this manner. Polyesters are surprisingly strong and rigid in thicknesses less than 0.001 inch, and would be suitable as supports for the silver image as far as this duplicating process is concerned.

*Example 6*

A drawing was made on 0.001 inch polyester (Mylar) sheeting with India ink. It was processed as in Example 1 (thermograph copier setting=8). The result was a clear, sharp reproduction.

*Example 7*

A drawing was made on 0.003 inch cellulose acetate with India ink and processed as in Example 1 (thermograph copier setting=8). The result was legible, but not so sharp as in Example 6.

Having thus described several preferred embodiments of my invention, I wish to point out that it is not limited thereto but is of the scope of the appended claims.

I claim:
1. The process comprising
   electrostatically charging the rear surface of a transparent film support, not exceeding .005 inch thickness, the other surface of which integrally carries a developed silver in gelatin photographic image, which support has sufficient electrical resistance to store electrostatic charges except when heated,
   exposing the silver image to radiation sufficient to heat the image and the areas of the underlying support to discharge said areas, and
   applying xerographic toner to said rear surface of the support distributed in accordance with the electrostatic image remaining thereon.
2. The process according to claim 1 in which said film support is polyester film less than .003 inch.
3. The process comprising
   electrostatically charging the rear surface of a transparent film support, the other surface of which bears a radiation absorbing image, which support has sufficient electrical resistance to store electrostatic charges except when heated,
   exposing the radiation absorbing image to radiation sufficient to heat the image and the areas of the support adjacent thereto to discharge said areas, and
   applying xerographic toner to said rear surface of the support distributed in accordance with the electrostatic image remaining thereon.
4. The process according to claim 3 in which said film support is polyester film less than .003 inch.
5. The process according to claim 3 in which said radiation absorbing image is a carbon-containing ink.

References Cited in the file of this patent

UNITED STATES PATENTS

| | | |
|---|---|---|
| 1,037,965 | Mortimer | Sept. 10, 1912 |
| 2,600,343 | Tuttle | June 10, 1952 |
| 2,616,057 | Coltman | Oct. 28, 1952 |
| 2,794,795 | Reynolds et al. | June 4, 1957 |
| 2,819,963 | Hamm | Jan. 14, 1958 |
| 2,914,403 | Sugarman | Nov. 24, 1959 |
| 2,914,996 | Whitham | Dec. 1, 1959 |
| 2,959,153 | Hider | Nov. 8, 1960 |
| 3,039,349 | Rodgers | June 19, 1962 |

FOREIGN PATENTS

| | | |
|---|---|---|
| 1,118,813 | Germany | Dec. 7, 1961 |